US010983913B2

(12) United States Patent
Anderson et al.

(10) Patent No.: US 10,983,913 B2
(45) Date of Patent: *Apr. 20, 2021

(54) SECURING EXCLUSIVE ACCESS TO A COPY OF A METADATA TRACK VIA A PROCESS WHILE THE METADATA TRACK IS HELD IN A SHARED MODE BY ANOTHER PROCESS (71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Lokesh M. Gupta, Tucson, AZ (US); Matthew J. Kalos, Tucson, AZ (US); Beth A. Peterson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,292

(22) Filed: Jul. 10, 2019

(65) Prior Publication Data
US 2019/0332539 A1 Oct. 31, 2019

Related U.S. Application Data (63) Continuation of application No. 15/666,359, filed on Aug. 1, 2017, now Pat. No. 10,387,321.

(51) Int. Cl.
*G06F 12/08* (2016.01)
*G06F 12/0868* (2016.01)
(Continued)

(52) U.S. Cl.
CPC .......... *G06F 12/0868* (2013.01); *G06F 3/065* (2013.01); *G06F 3/067* (2013.01);
(Continued)

(58) Field of Classification Search
CPC ............ G06F 12/0868; G06F 12/0862; G06F 12/0895; G06F 11/1435; G06F 12/08; G06F 12/0897
See application file for complete search history.

(56) References Cited

U.S. PATENT DOCUMENTS 6,425,050 B1 7/2002 Beardsley et al.
7,472,312 B2 12/2008 Jarvis et al.
(Continued)

OTHER PUBLICATIONS

U.S. Appl. No. 15/666,359, filed Aug. 1, 2017.
(Continued)

Primary Examiner — Reginald G Bragdon
Assistant Examiner — Thanh D Vo
(74) Attorney, Agent, or Firm — Rabindranath Dutta; Konrad Raynes Davda & Victor LLP (57) ABSTRACT In response to determining, by a storage controller, that a first process is to perform a write operation, a customer data track in a cache is configured for exclusive access while waiting for the write operation on the customer data track to be performed by the first process. In response to configuring the customer data track for the exclusive access, a copy of a metadata track is generated, wherein the metadata track stores metadata information of the customer data track and is configured for shared access. The copy of the metadata track is configured to provide exclusive access to a second process to perform operations on the copy of the metadata track, wherein the first process is able to perform the write operation on the customer data track that causes the meta-
(Continued)

data track to be updated while the second process performs the operations on the copy of the metadata track.

20 Claims, 9 Drawing Sheets (51) Int. Cl.
*G06F 3/06* (2006.01)
*G06F 12/128* (2016.01)
*G06F 12/0831* (2016.01)
*G06F 12/0871* (2016.01)
*G06F 12/0866* (2016.01)
*G06F 12/084* (2016.01)
*G06F 12/0842* (2016.01)
*G06F 12/0862* (2016.01)
*G06F 12/14* (2006.01)
*G06F 12/123* (2016.01)

(52) U.S. Cl.
CPC .......... *G06F 3/0619* (2013.01); *G06F 3/0622* (2013.01); *G06F 12/084* (2013.01); *G06F 12/0831* (2013.01); *G06F 12/0842* (2013.01); *G06F 12/0866* (2013.01); *G06F 12/0871* (2013.01); *G06F 12/128* (2013.01); *G06F 12/0862* (2013.01); *G06F 12/123* (2013.01); *G06F 12/1441* (2013.01); *G06F 2212/1016* (2013.01); *G06F 2212/1032* (2013.01); *G06F 2212/261* (2013.01); *G06F 2212/312* (2013.01); *G06F 2212/462* (2013.01); *G06F 2212/466* (2013.01); *G06F 2212/604* (2013.01); *G06F 2212/6028* (2013.01); *G06F 2212/621* (2013.01)

(56) References Cited

U.S. PATENT DOCUMENTS

| | | |
|---|---|---|
| 7,885,921 B2 | 2/2011 | Mahar et al. |
| 8,566,530 B2 | 10/2013 | Benhase et al. |
| 9,542,331 B2 | 1/2017 | Ash et al. |
| 2013/0024627 A1 | 1/2013 | Benhase et al. |
| 2019/0042115 A1 | 2/2019 | Anderson et al. |

OTHER PUBLICATIONS

Notice of Allowance dated Apr. 10, 2019, pp. 14, for U.S. Appl. No. 15/666,359, filed Aug. 1, 2017.
List of IBM Patents or Patent Applications Treated as Related, Jul. 10, 2019, pp. 2.

SECURING EXCLUSIVE ACCESS TO A COPY OF A METADATA TRACK VIA A PROCESS WHILE THE METADATA TRACK IS HELD IN A SHARED MODE BY ANOTHER PROCESS

CROSS-REFERENCE TO RELATED APPLICATION

This application is a continuation of U.S. patent application Ser. No. 15/666,359, filed Aug. 1, 2017, which application is incorporated herein by reference in its entirety.

BACKGROUND

1. Field

Embodiments relate to the securing of exclusive access of a metadata track via a process while the metadata track is held in a shared mode by another process.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include a cache. Data written from a host may be stored in the cache and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device.

SUMMARY OF THE PREFERRED EMBODIMENTS

Provided are a method, system, and computer program product in which in response to determining that a first process is to perform a write operation, a customer data track in a cache is configured for exclusive access while waiting for the write operation on the customer data track to be performed by the first process. In response to configuring the customer data track for the exclusive access, a copy of a metadata track is generated, wherein the metadata track stores metadata information of the customer data track and is configured for shared access. The copy of the metadata track is configured to provide exclusive access to a second process to perform operations on the copy of the metadata track, wherein the first process is able to perform the write operation on the customer data track that causes the metadata track to be updated while the second process performs the operations on the copy of the metadata track.

In certain embodiments, the first process is a syncio process that allows a host computational device to hold an application thread in a spin loop waiting for the write operation to complete.

In additional embodiments, the second process is a destage process that destages the copy of the metadata track from the cache to a storage device.

In yet additional embodiments, in response to completion of destaging of the copy of the metadata track, the copy of the metadata track is deleted, wherein the exclusive access on the copy of the metadata track is removed.

In further embodiments, the host computational device is coupled to the storage controller via both a bus interface and a network interface, wherein the syncio process communicates over the bus interface.

In additional embodiments, if a selected track is configured for shared access, then any process requesting exclusive access to the selected track has to wait until all processes having shared access to the selected track release the selected track.

In yet additional embodiments, if the selected track is configured for exclusive access for a selected process, then any process requesting shared or exclusive access to the selected track has to wait until the selected track is released by the selected process.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Syncio (also referred to as sync I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in Syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt.

The code path for syncio needs to be extremely optimized to satisfy the time requirements for syncio operations. For syncio writes (e.g., writes to database logs), an application may predetermine the tracks the application is likely to access. For such tracks, the application may secure track access prior to the occurrence of the write. Track access in a storage controller may involve allocation of cache and non-volatile storage (NVS) segments which are time consuming operations. When writes occur, the execution of the writes on tracks is performed relatively fast, since track access has already been secured in advance of the occurrence of the writes.

However, in certain situation, writes may not occur for an extended period of time and track access may be held indefinitely. As a result, track access on the customer data track and associated metadata tracks may be held indefinitely. If other host I/O or internal processes desire access to the customer data track or associated metadata track, the host I/O or the internal processes may be have to wait. For customer data track accesses taken by prefetching of tracks, customer data track accesses may be released when another process requests access. However, for metadata track access, it is relatively time consuming to determine which customer track access was taken by syncio processes, since a metadata track may have information for many (e.g., over 1000) customer tracks.

In certain embodiments, when a process requests access to a customer data track and customer data track access is already taken by prefetch operations, then customer track access taken by prefetch operations is released. However, when a process (e.g., a destage process) requests exclusive access for a metadata track and access is already held by another process in shared mode then a copy of the metadata track is generated after the original track in the cache directory chain and the copy of the metadata track is used for destage. Syncio process may continue to hold the shared access to the original metadata track while the destage process holds exclusive access on the copy of the metadata track. After destage is complete, the copy of the metadata track that was destaged is removed from the cache, wherein exclusive access to the copy of the metadata track is also removed. Syncio processes may meanwhile update the original metadata track in the cache.

Exemplary Embodiments

Figure 1:
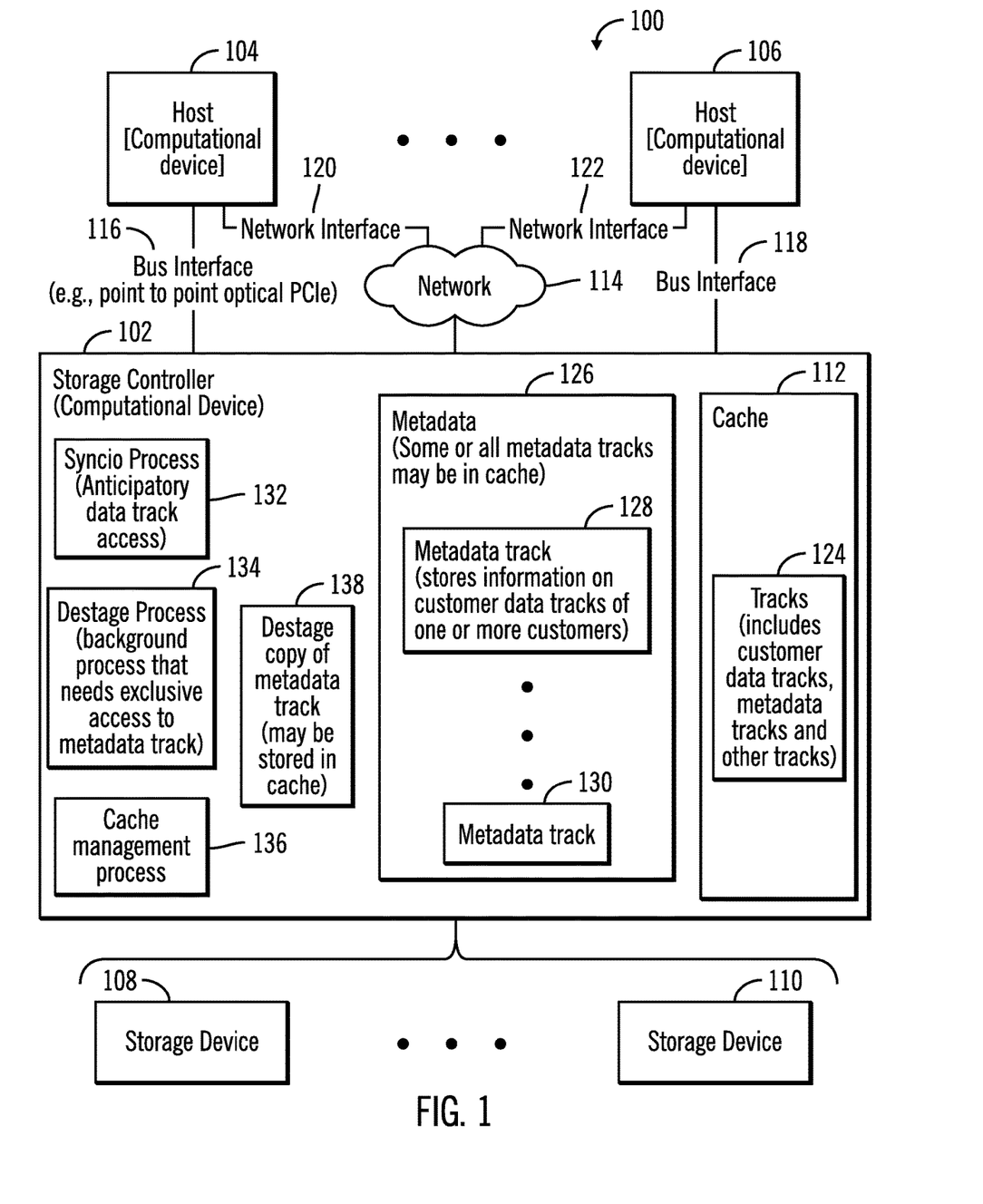
FIG. 1 illustrates a block diagram of a computing environment comprising a storage controller coupled to one or more hosts and one or more storage devices for integrating syncio processing with cache management, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in one or more of the storage devices 108, 110 and/or a cache 112 (e.g., a memory) of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network 114, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, the hosts 104, 106 may be coupled to the storage controller 102 via a bus interface (e.g., a point to point optical PCIe interface) 116, 118 and a network interface 120, 122. Syncio operations from the hosts 104, 106 may be performed over the bus interfaces 116, 118. Traditional I/O operations from the hosts 104, 106 may be performed over the network interfaces 120, 122. The bus interfaces 116, 118 may comprise a faster access channel for I/O than the network interfaces 120, 122. Additional bus interface technology to extend the bus interface 116, 118 may be utilized, including PCIe extender cables or components, such as a distributed PCIe switch, to allow PCIe over Ethernet, such as with the ExpEther technology.

The cache 112 may store a plurality of tracks 124 that include customer data tracks, metadata tracks, and other tracks. Each of the metadata tracks may store information on one or more customer data track. Therefore, metadata 126 for a plurality of customer data tracks is stored in a plurality of metadata tracks 128, 130 where each metadata track stores information on customer data tracks of one or more customers and some or all of the metadata tracks 128, 130 may be present in the cache 112.

The storage controller 102 executes a syncio process 132, a destage process 134 that may execute as a background process, and a cache management process 136. The syncio process 132 may perform prefetching of customer data tracks prior to writes, while supporting syncio operations from the hosts 104, 106 via the bus interfaces 116, 118. The destage processes 134 may need exclusive access to metadata tracks that are to be destaged from the cache 112 to the storage devices 108, 110. The cache management process 136 may perform various management operations related to the cache 112, the tracks of the cache 124, and the metadata 126 including the metadata tracks 128, 130.

In certain embodiments, to provide exclusive access to the destage process 134 to a metadata track 128 that is stored in the cache 112 for shared access, a copy of the metadata track 128 is made, where the copy of the metadata track 128 is referred to as the destage copy 138. The destage copy 138 may also be stored in the cache 112.

In certain embodiments, when the syncio process 132 performs writes to customer data tracks, the corresponding metadata track may be updated by the cache management process 136. If the destage process 134 is initiated or is executing in the background, then the destage process 134 destages the destage copy of the metadata track 138 while the metadata track is being updated. Therefore, in certain embodiments shown in FIG. 1, the destage process 134 secures exclusive access to a copy of a metadata track while the metadata track is held in a shared mode by the syncio process 132.

Figure 2:
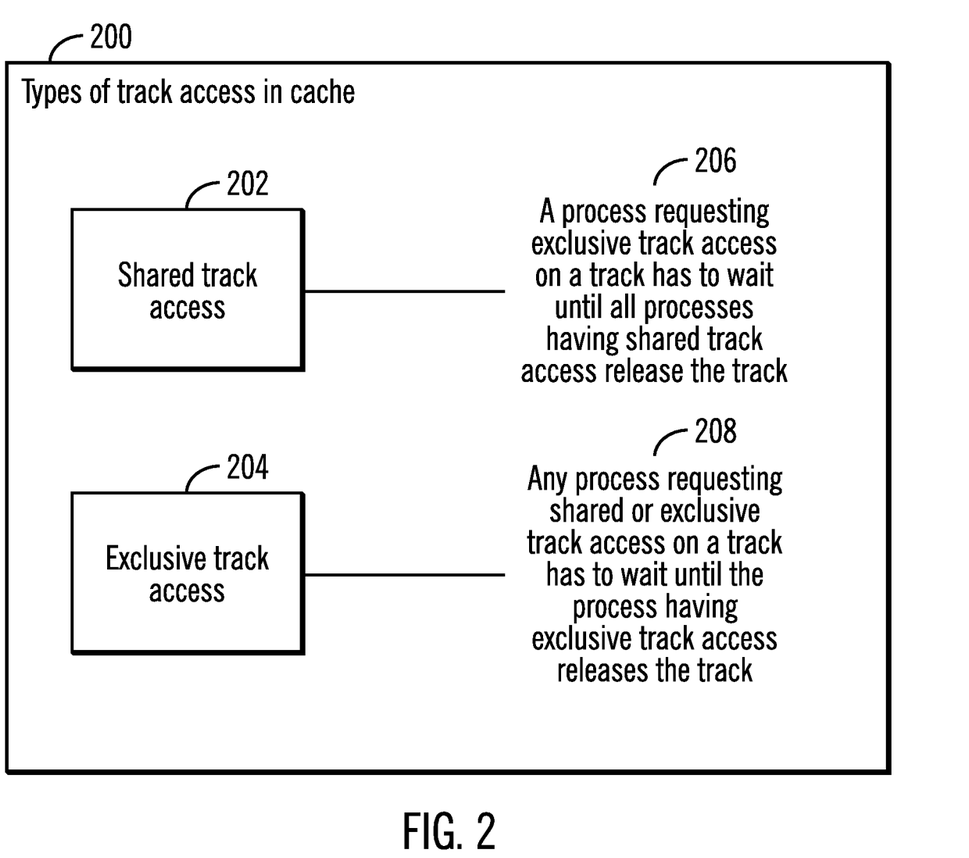
FIG. 2 illustrates a block diagram that shows types of track access in cache, in accordance with certain embodiments.

FIG. 2 illustrates a block diagram 200 that shows different types of track access in the cache 112, in accordance with certain embodiments.

There are two types of track access in the cache 112. A first type of track access is shared track access 202, and a second type of track access is exclusive track access 204.

Processes that request shared track access 202 may access the track at the same time with other processes that request the shared track access 202. Processes that need access to a track exclusively may request exclusive track access 204.

If there are shared accesses on the track when an exclusive access is requested by a process, then the request for the exclusive access has to wait for all processes with shared accesses to release the track before exclusive access can be granted (as shown via reference numeral 206). Similarly, a shared or exclusive access request from a process for a track which is under exclusive access via another process has to wait for the exclusive access to be released before the shared or exclusive access can be granted (as shown via reference numeral 208).

Figure 3:
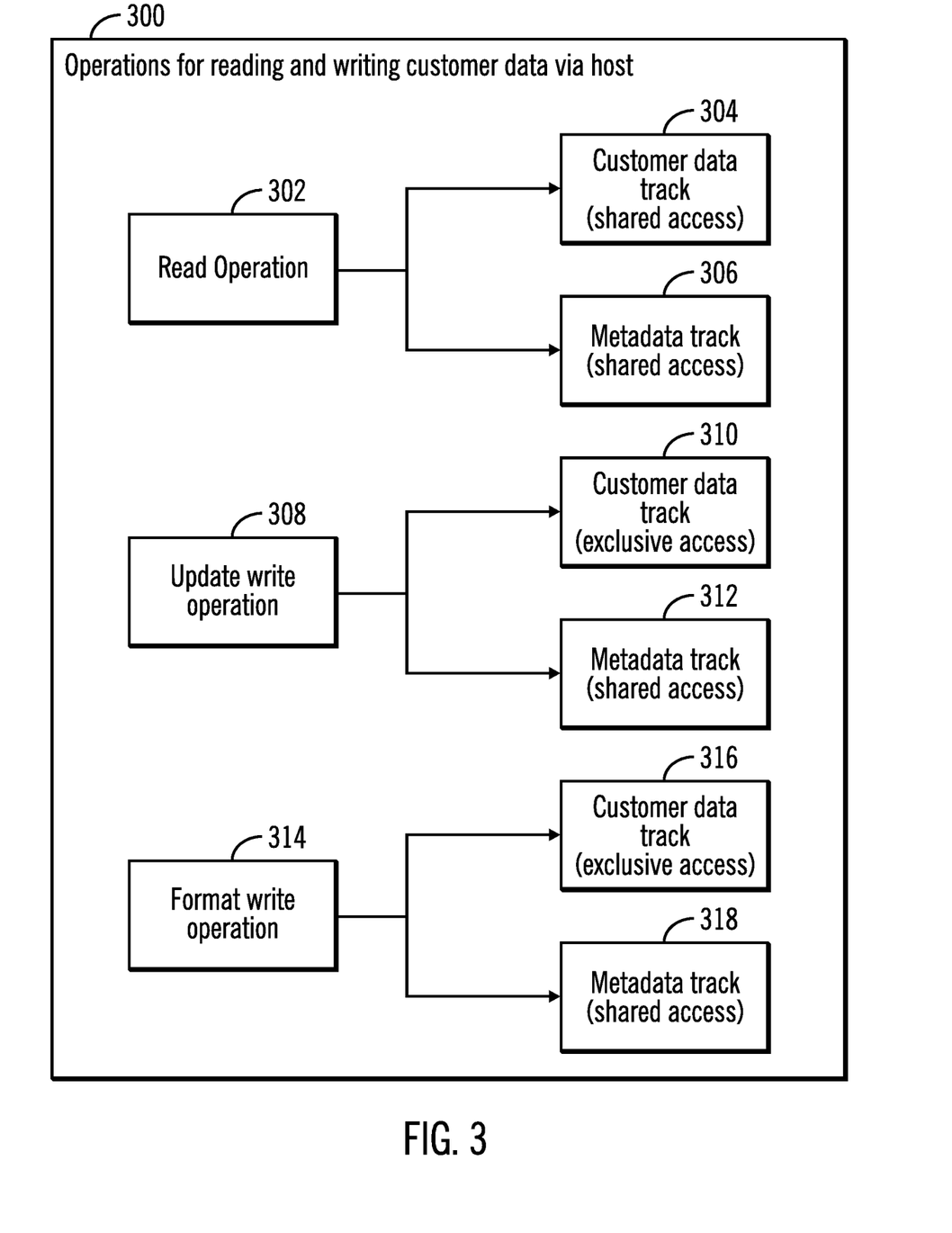
FIG. 3 illustrates a block diagram that shows operations for reading and writing customer data via a host, in accordance with certain embodiments.

FIG. 3 illustrates a block diagram 300 that shows operations for reading and writing customer data via a host 104, in accordance with certain embodiments.

During a "read" operation 302, the cache management process 136 (or the syncio process 132 or some other process) takes shared access on the customer data tracks (reference numeral 304) and shared access on the metadata tracks (reference numeral 306). The mode of access is set to "read" as well.

During an "update write" operation 308, the cache management process 136 (or the syncio process 132 or some other process) takes exclusive access on the customer data tracks (reference numeral 310) and shared access on the metadata tracks (reference numeral 312). The mode of access is set to "update" on the customer data tracks and "read" on the metadata tracks.

During a "format write" operation 314, the cache management process 136 (or the syncio process 132 or some other process) takes exclusive access on the customer data tracks (reference numeral 316) and shared access on the metadata tracks (reference numeral 318). The mode of access is set to "update" on the customer data tracks and "update" on the metadata tracks, as format write operations 314 necessitate updates to the metadata tracks.

Therefore, none of the reading and writing of customer data via the host 104, 106 through the storage controller 102 takes exclusive access on metadata tracks. The cache 112 relies on track access on customer data tracks to ensure that metadata for a track may be updated by a single client at a time. This allows for maximum parallelism, and two customer tracks may be updated in parallel. Internal operation like destage on a metadata track needs to take track access in exclusive mode. A track in cache 112 should not be updated while it is being destaged otherwise the least recently used (LRU) count may be erroneous on the track since the LRU count is computed when the track is modified via the updating.

Figure 4:
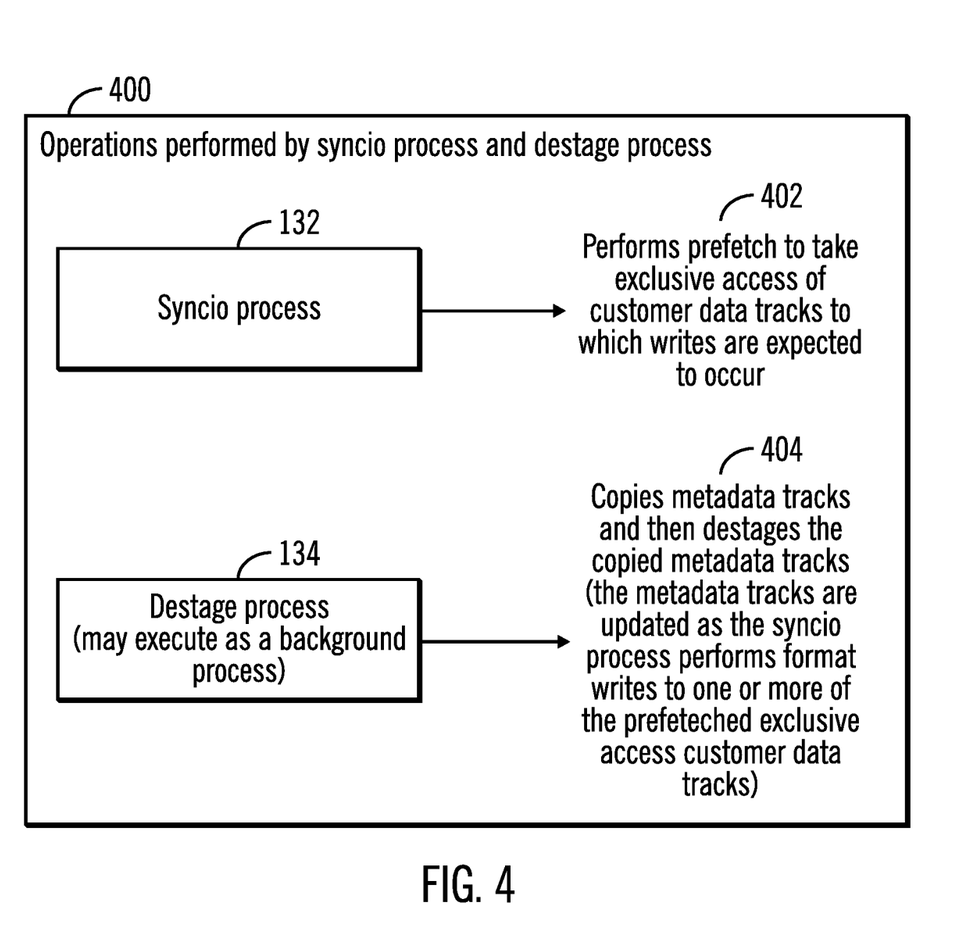
FIG. 4 illustrates a block diagram that shows operations performed by a syncio process and a destage process, in accordance with certain embodiments.

FIG. 4 illustrates a block diagram 400 that shows operations performed by a syncio process 132 and a destage process 134 that may execute as a background process, in accordance with certain embodiments.

The syncio process 132 performs a prefetch to secure exclusive access of customer data tracks to which writes are expected to occur (shown via reference numeral 402). The destage process 134 copies metadata tracks and then destages the copied metadata tracks (shown via reference numeral 404). The destage process 134 may comprise a background process that executes concurrently with the syncio process 132. The metadata tracks may be updated as the syncio process 132 performs format writes to one or more of the prefetched exclusive access customer data tracks.

In certain embodiment, when the syncio process 132 secures track access on a customer data track, a bit may marked in a control block for cache data that customer track access was taken by the syncio process 132. If another host or process generates a command to read from the track or write to the track then track access on the customer data track is released, so other processes can read from the track or write to the track.

Figure 5:
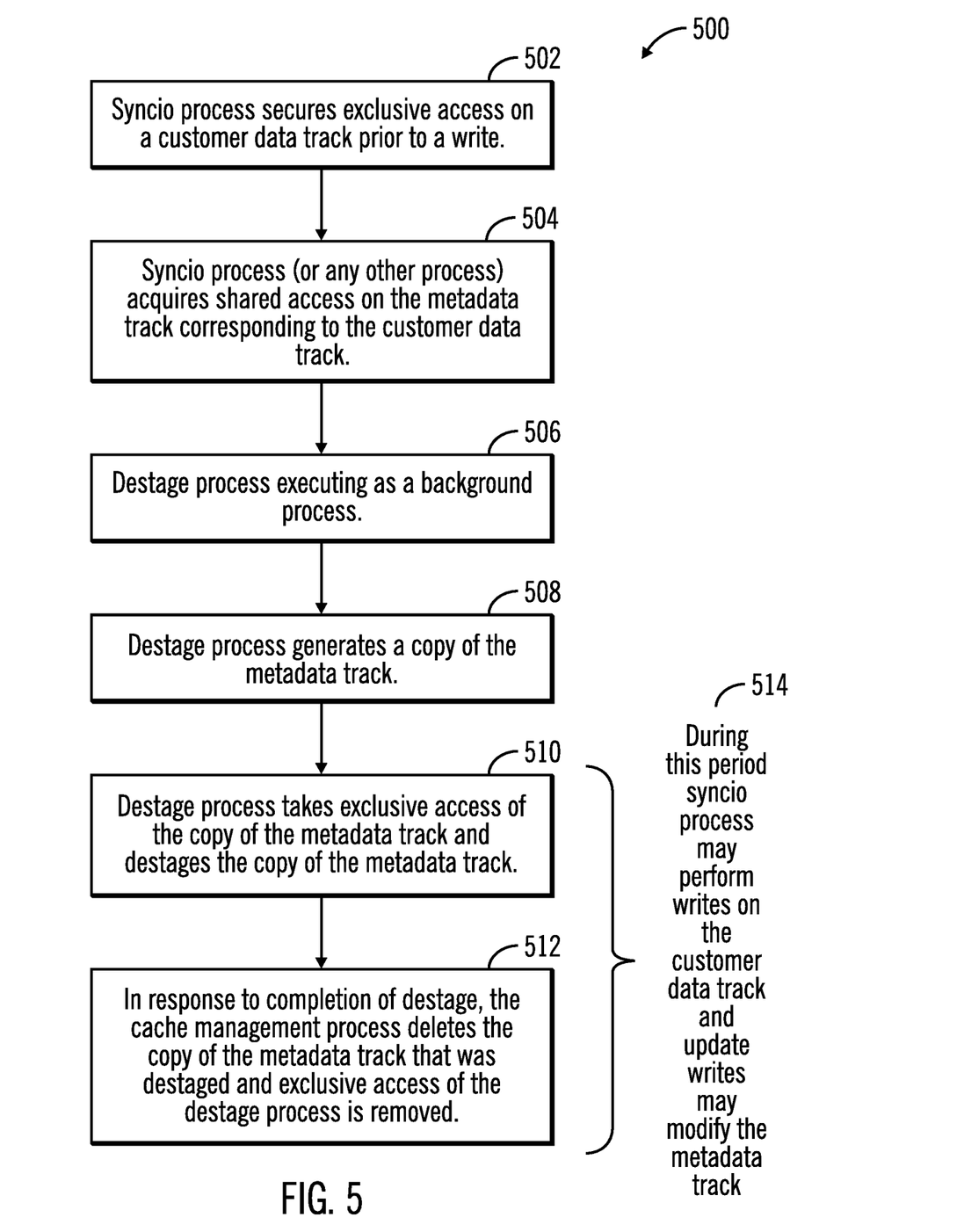
FIG. 5 illustrates a first flowchart that shows how a syncio process performs operations concurrently with a destage process, in accordance with certain embodiments.

FIG. 5 illustrates a first flowchart 500 that shows how a syncio process 132 performs operations concurrently with a destage process 134, in accordance with certain embodiments. The operations shown in FIG. 5 may be performed in the storage controller 102.

Control starts at block 502, in which when the syncio process 132 secures exclusive access on a customer data track prior to a write. Control proceeds to block 504, in which the syncio process 132 (or any other process) acquires metadata access in a shared mode on the associated metadata track corresponding to the customer data track. The metadata access will be held till the customer data track access is released. However, if the syncio process 132 keeps customer track access indefinitely then metadata access will also be held indefinitely. This is not a problem for host I/O since reads and writes take shared access on metadata tracks. However, internal operations like destage need to take exclusive access on metadata tracks. Destage operations on a track cannot allow concurrent updates to the track to be destaged. This may create a deadlock since the destage process 134 needs exclusive access of a metadata track but the syncio process 132 has taken shared access of the metadata track to which exclusive access is needed by the destage process 134.

In embodiments that avoid this deadlock, control proceeds to block 506 in which a destage process 134 is shown as executing as a background process. The destage process 134 generates (at block 508) a copy of the metadata track. The copy of the metadata track may be created after the original track in the cache directory chain. Therefore, if syncio or another process that writes to a customer data track holds access to a corresponding metadata track in a shared access mode then the destage process 134 creates a copy of the metadata track.

The destage process 134 takes exclusive access of the copy of the metadata track (i.e., the destage copy 138) and destages (at block 510) the copy of the metadata track. The syncio process 132 continues to hold the shared access on the original metadata track in the cache 112.

In response to completion of destage, the cache management process 136 deletes the copy of the metadata track 138 that was destaged and exclusive access of the destage process is removed (at block 512). During the period indicated by blocks 510, 512, the syncio process 132 may perform writes on the customer data track and if the writes are update writes then the metadata track may be modified (at block 514).

Figure 6:
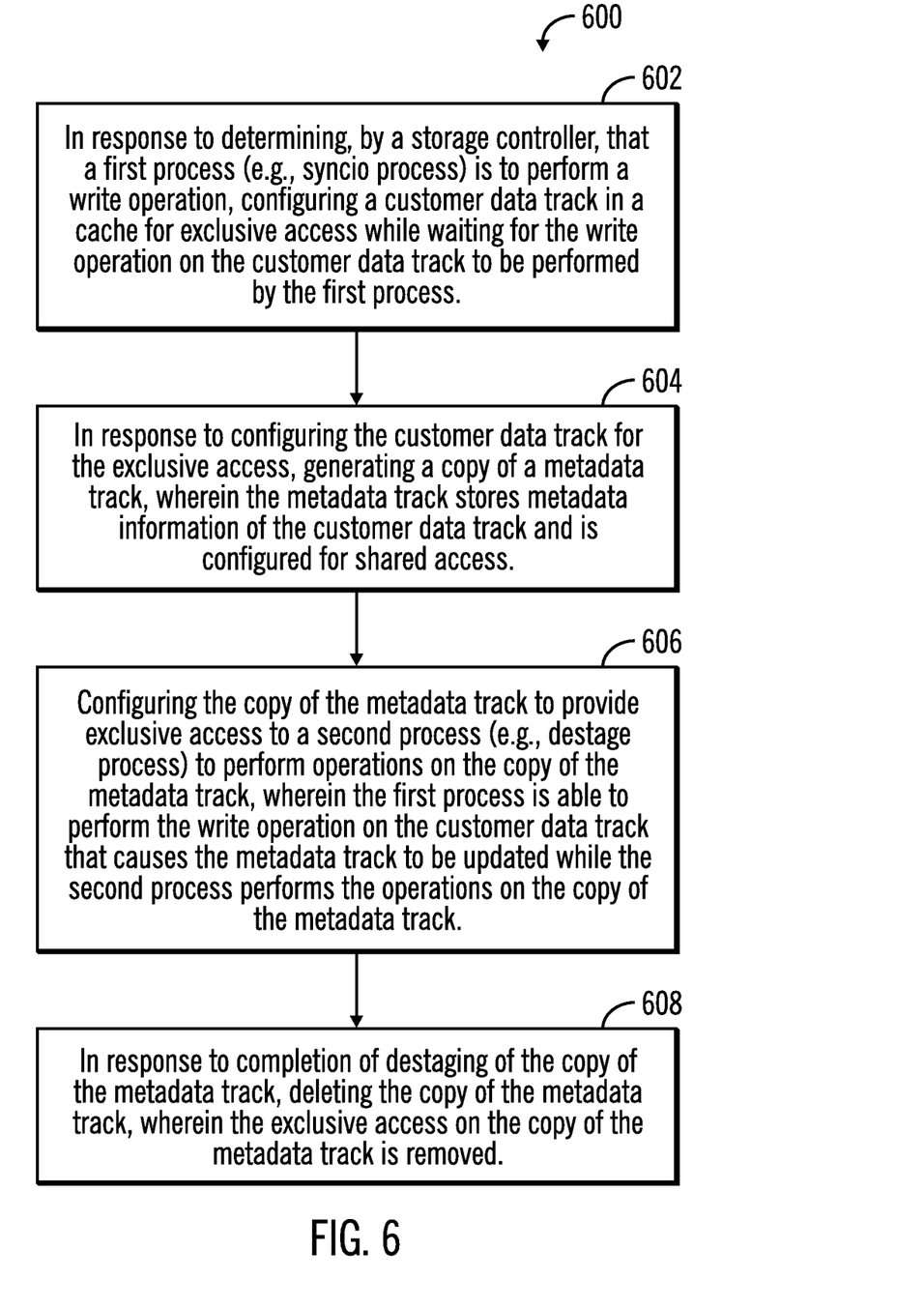
FIG. 6 illustrates second flowchart that shows how a syncio process performs operations concurrently with a destage process, in accordance with certain embodiments.

FIG. 6 illustrates a second flowchart 600 that shows how a syncio process 132 performs operations concurrently with a destage process 134, in accordance with certain embodiments. The operations shown in FIG. 6 may be performed in the storage controller 102.

Control starts at block 602, in which in which response to determining, by a storage controller 102, that a first process (e.g., a syncio process) 132 is to perform a write operation, a customer data track in a cache 112 is configured for exclusive access while waiting for the write operation on the customer data track to be performed by the first process 132.

In response to configuring the customer data track for the exclusive access, a copy of a metadata track (e.g., destage copy 138) is generated (at block 604), wherein the metadata track stores metadata information of the customer data track and is configured for shared access. The copy of the metadata track is configured (at block 606) to provide exclusive access to a second process (e.g., the destage process) 134 to perform operations on the copy of the metadata track, wherein the first process 132 is able to perform the write operation on the customer data track that causes the metadata track to be updated while the second process 134 performs the operations on the copy of the metadata track 138.

From block 606 control proceeds to clock 608 in which in response to completion of destaging of the copy of the metadata track, the copy of the metadata track is deleted, wherein the exclusive access on the copy of the metadata track is also removed.

Therefore, FIGS. 1-6 illustrate certain embodiments in which exclusive access for a copy of a metadata track 128 is obtained by a destage process 134 by generating a destage copy 138 of the metadata track 128 that is under shared access. While the destage copy 138 is being destaged by the destage process 134, the metadata track 128 may be updated as a result of writes by the syncio process 132 on the customer data track corresponding to the metadata track 128. As a result syncio operations may occur concurrently with destaging of metadata tracks from the cache 112.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
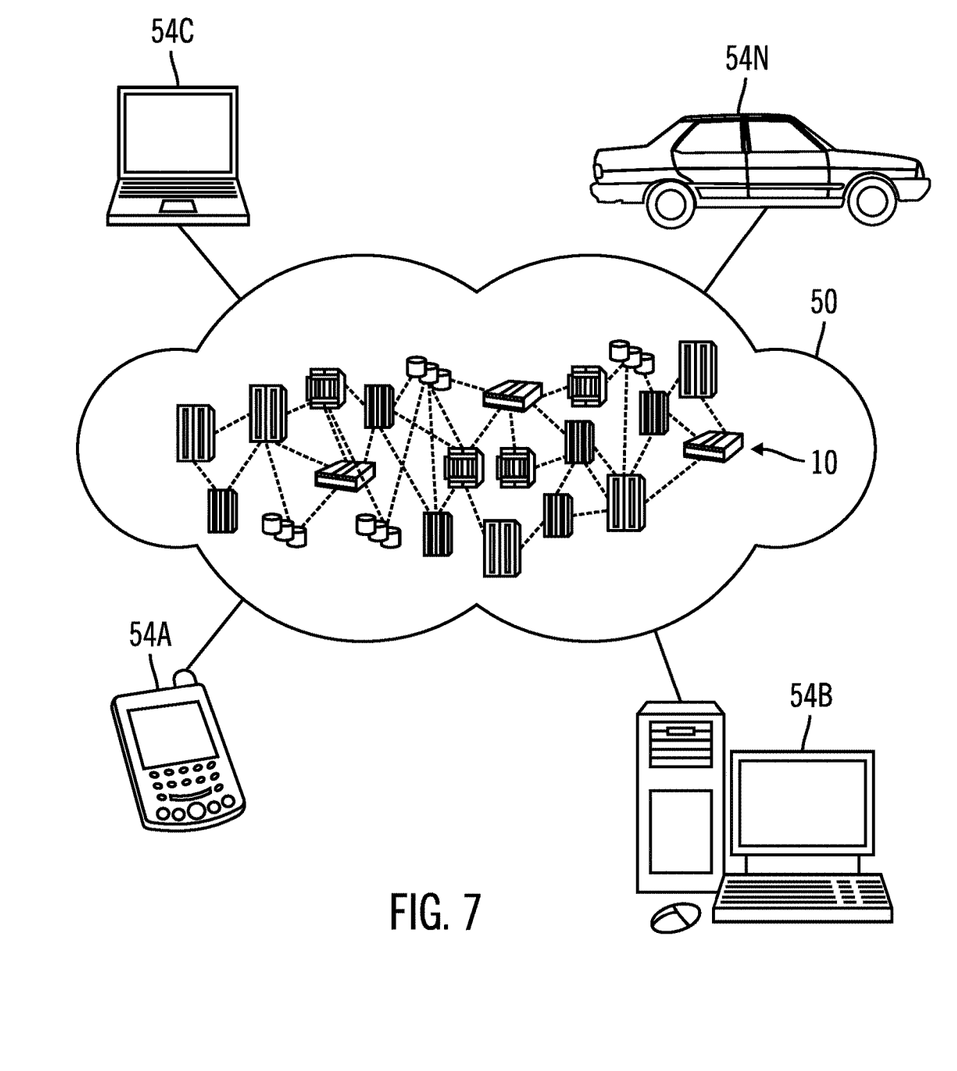
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
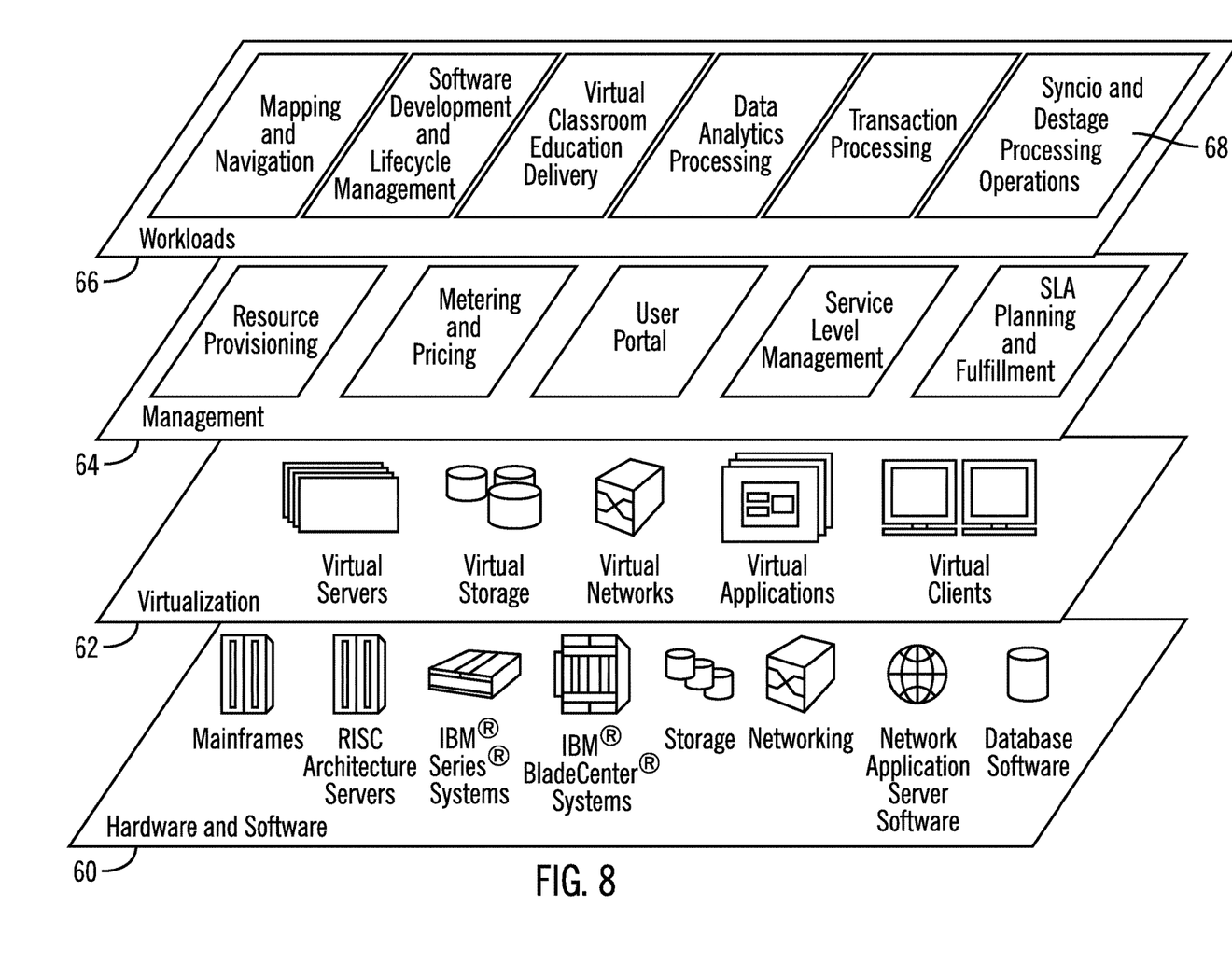
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and syncio and destage processing operations 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
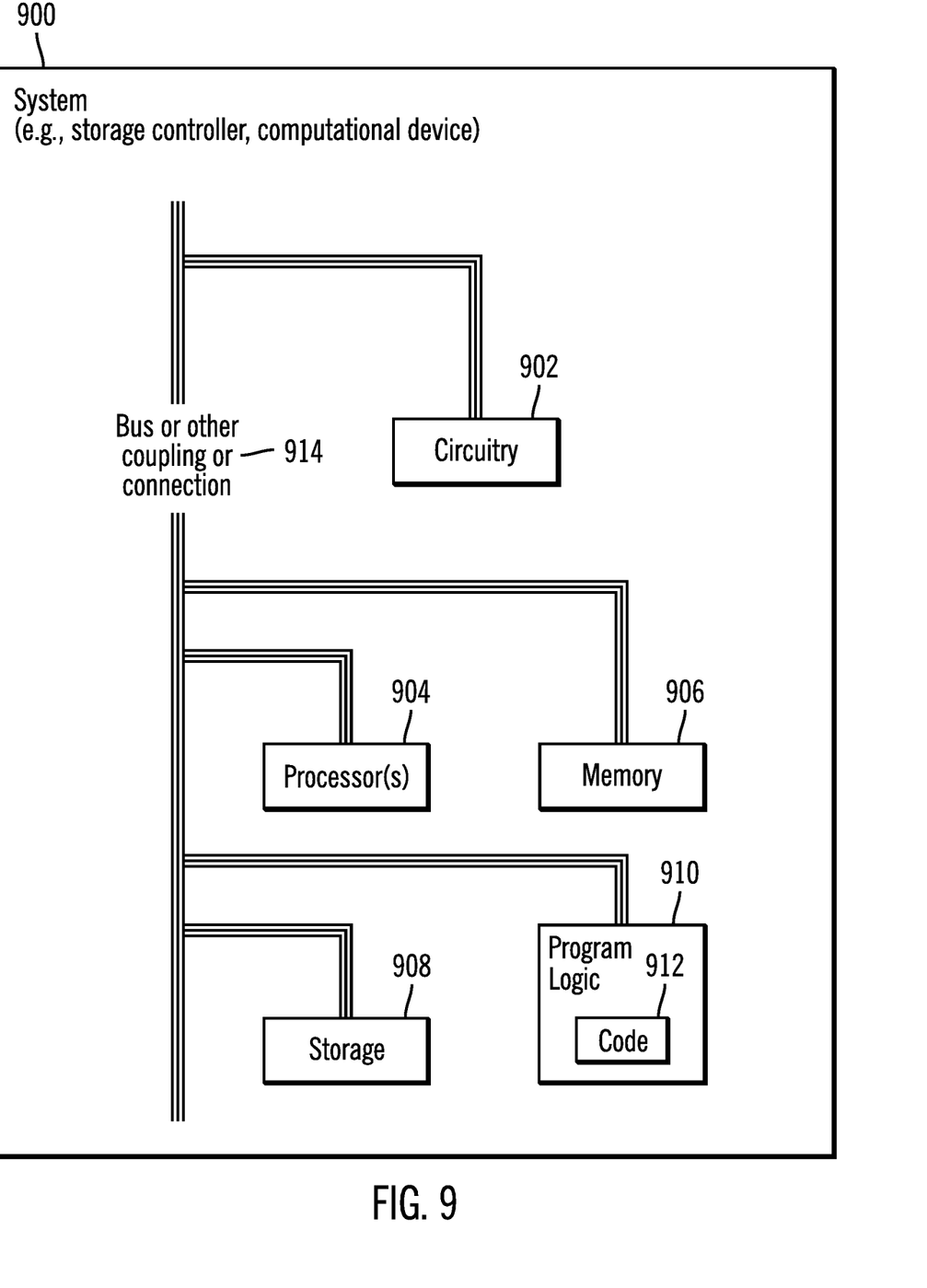
FIG. 9 illustrates a block diagram of a computational system that shows certain elements that may be included in the storage controller or the host, as described in FIGS. 1-8, in accordance with certain embodiments.

FIG. 9 illustrates a block diagram that shows certain elements that may be included in the storage controller 102, the hosts 104,106, or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   in response to configuring a data track for exclusive access while waiting for a write operation on the data track to be performed by a first process, generating a copy of a metadata track that is configured for shared access; and
   configuring the copy of the metadata track to provide exclusive access to a second process to perform operations on the copy of the metadata track, wherein the first process is able to perform the write operation on the data track that causes the metadata track to be updated while the second process performs the operations on the copy of the metadata track.

2. The method of claim 1, wherein the first process is a syncio process that allows a host computational device to hold an application thread in a spin loop waiting for the write operation to complete.

3. The method of claim 2, wherein the second process is a destage process that destages the copy of the metadata track from a cache to a storage device.

4. The method of claim 3, the method further comprising:
   in response to completion of destaging of the copy of the metadata track, deleting the copy of the metadata track, wherein the exclusive access on the copy of the metadata track is removed.

5. The method of claim 3, wherein the host computational device is coupled to a storage controller via both a bus interface and a network interface, and wherein the syncio process communicates over the bus interface.

6. The method of claim 1, wherein if a selected track is configured for shared access, then any process requesting exclusive access to the selected track has to wait until all processes having shared access to the selected track release the selected track.

7. The method of claim 6, wherein if the selected track is configured for exclusive access for a selected process, then any process requesting shared or exclusive access to the selected track has to wait until the selected track is released by the selected process.

8. A system comprising:
a memory; and
a processor coupled to the memory, wherein the processor performs operations, the operations performed by the processor comprising:
in response to configuring a data track for exclusive access while waiting for a write operation on the data track to be performed by a first process, generating a copy of a metadata track that is configured for shared access; and
configuring the copy of the metadata track to provide exclusive access to a second process to perform operations on the copy of the metadata track, wherein the first process is able to perform the write operation on the data track that causes the metadata track to be updated while the second process performs the operations on the copy of the metadata track.

9. The system of claim 8, wherein the first process is a syncio process that allows a host computational device to hold an application thread in a spin loop waiting for the write operation to complete.

10. The system of claim 9, wherein the second process is a destage process that destages the copy of the metadata track from a cache to a storage device.

11. The system of claim 10, the operations performed by the processor further comprising:
in response to completion of destaging of the copy of the metadata track, deleting the copy of the metadata track, wherein the exclusive access on the copy of the metadata track is removed.

12. The system of claim 10, wherein the host computational device is coupled to the system via both a bus interface and a network interface, and wherein the syncio process communicates over the bus interface.

13. The system of claim 8, wherein if a selected track is configured for shared access, then any process requesting exclusive access to the selected track has to wait until all processes having shared access to the selected track release the selected track.

14. The system of claim 13, wherein if the selected track is configured for exclusive access for a selected process, then any process requesting shared or exclusive access to the selected track has to wait until the selected track is released by the selected process.

15. A computer program product, the computer program product comprising a computer readable storage medium having computer readable program code embodied therewith, the computer readable program code configured to perform operations, the operations comprising:
in response to configuring a data track for exclusive access while waiting for a write operation on the data track to be performed by a first process, generating a copy of a metadata track that is configured for shared access; and
configuring the copy of the metadata track to provide exclusive access to a second process to perform operations on the copy of the metadata track, wherein the first process is able to perform the write operation on the data track that causes the metadata track to be updated while the second process performs the operations on the copy of the metadata track.

16. The computer program product of claim 15, wherein the first process is a syncio process that allows a host computational device to hold an application thread in a spin loop waiting for the write operation to complete.

17. The computer program product of claim 16, wherein the second process is a destage process that destages the copy of the metadata track from a cache to a storage device.

18. The computer program product of claim 17, the operations further comprising:
in response to completion of destaging of the copy of the metadata track, deleting the copy of the metadata track, wherein the exclusive access on the copy of the metadata track is removed.

19. The computer program product of claim 17, wherein the host computational device is coupled to a storage controller via both a bus interface and a network interface, and wherein the syncio process communicates over the bus interface.

20. The computer program product of claim 15, wherein if a selected track is configured for shared access, then any process requesting exclusive access to the selected track has to wait until all processes having shared access to the selected track release the selected track, and wherein if the selected track is configured for exclusive access for a selected process, then any process requesting shared or exclusive access to the selected track has to wait until the selected track is released by the selected process.

* * * * *